United States Patent [19]
Trebino et al.

[11] Patent Number: 6,008,899
[45] Date of Patent: Dec. 28, 1999

[54] APPARATUS AND METHOD FOR OPTICAL PULSE MEASUREMENT

[75] Inventors: Rick P. Trebino, Livermore, Calif.; Thomas Tsang, Brooklyn, N.Y.; David N. Fittinghoff, San Diego, Calif.; John N. Sweetser, Livermore, Calif.; Marco A. Krumbuegel, Danville, Calif.

[73] Assignee: Sandia Corporation, Livermore, Calif.

[21] Appl. No.: 08/878,301

[22] Filed: Jun. 18, 1997

[51] Int. Cl.[6] .................................................. G01B 9/02
[52] U.S. Cl. .......................... 356/345; 356/346; 250/550
[58] Field of Search .................................. 356/345, 346, 356/358; 250/550, 37 L

[56] References Cited

U.S. PATENT DOCUMENTS 4,480,192  10/1984  Albrecht et al. ......................... 250/550
5,530,544   6/1996  Trebino et al. .......................... 356/345

*Primary Examiner*—Robert Kim
*Attorney, Agent, or Firm*—Kurt Olsen

[57] ABSTRACT

Practical third-order frequency-resolved optical grating (FROG) techniques for characterization of ultrashort optical pulses are disclosed. The techniques are particularly suited to the measurement of single and/or weak optical pulses having pulse durations in the picosecond and subpicosecond regime. The relative quantum inefficiency of third-order nonlinear optical effects is compensated for through i) use of phase-matched transient grating beam geometry to maximize interaction length, and ii) use of interface-enhanced third-harmonic generation.

21 Claims, 2 Drawing Sheets

APPARATUS AND METHOD FOR OPTICAL PULSE MEASUREMENT

STATEMENT OF GOVERNMENT INTEREST

This invention was made with Government support under Contract DE-AC04-94DP85000 awarded by the U.S. Department of Energy. The Government has certain rights in the invention.

CROSS REFERENCE TO RELATED APPLICATIONS

Not Applicable

BACKGROUND OF THE INVENTION

The present invention relates generally to the use of nonlinear optical effects for characterization of ultrashort (optical pulse duration $\tau<10^{-10}$ seconds) laser pulses, and, more particularly, to apparatus and methods for such characterization utilizing third-order frequency-resolved optical grating (FROG) techniques.

Advances in laser technology have required corresponding advances in optical diagnostic and characterization methods and apparatus. For example, as the pulse width available to technology entered the picosecond and sub-picosecond regime, the ability of conventional optoelectronic techniques, such as electrically recorded light-sensitive diodes or electronic streak cameras, to record and characterize such ultrashort pulses became quite limited.

In response, a class of purely optical techniques for measuring extremely short optical pulses has evolved. These techniques may be described as gating techniques, wherein a light pulse of known characteristics and controllable time delay is used, generally through nonlinear optical effects, to control the light coming from an unknown optical pulse. As the time delay is varied, different parts of the unknown optical pulse are allowed to pass through the gate. Measurement of the amount of light which so passes can be measured by optoelectronic means, even when the pulse duration is shorter than the temporal resolution of the sensor. By varying the time delay, it is thereby possible to determine, for example, the duration and relative intensity of an unknown optical pulse.

Considerably more information resides in an optical pulse, however. An ultrashort laser pulse, rather than being monochromatic, is spread over a spectral range. The extent of such broadening is on the order of $\Delta\omega/\omega \sim 1/\omega\tau$, where $\Delta\omega$ is the width of the spectral range found in the optical pulse, $\omega$ is the average frequency of the optical pulse, and $\tau$ is the duration of the optical pulse. For example, if $\omega=6\times10^{14}$ Hz (blue light) and $\tau=10$ femtoseconds, then the fractional bandwidth $\Delta\omega/\omega$ is ~0.16. Such an optical pulse thus contains photons ranging in frequency (nominally) from ~$5\times10^{14}$ Hz (green) to ~$7\times10^{14}$ Hz (violet).

A great deal of information concerning the pulse shape, phase, polarization, and other factors of interest are encoded in the time-dependent spectrum of the optical pulse. A class of techniques which may be termed spectrally-sensitive gating techniques have been developed to make this information accessible. The basic idea is to measure the spectrum of an optically-gated pulse as a function of the time delay, thereby obtaining time-resolved spectral information describing the optical pulse.

One approach to implementing spectrally-sensitive gating are frequency-resolved optical grating (FROG) based techniques, which are known to be capable of directly obtaining intensity and phase information concerning an ultrashort optical pulse. In the simplest form, an input light pulse is formed into a probe pulse. A gate pulse is provided (derived either from the probe pulse or from a separate beam) having a variable delay relative to the probe pulse. The gate pulse and the probe pulse are then combined in a nonlinear medium to form a signal pulse representing the probe pulse characteristics at a time functionally related to the delay of the gate pulse, thereby providing a series of temporal slices of the probe pulse. A spectrometer receives the output pulse to generate an intensity signal as a function of delay and wavelength.

Numerous FROG-based techniques for characterizing optical pulses exist. The gate pulse can be delayed with various values to provide a plot of signal intensity vs. wavelength and gate pulse delay. Alternatively, the gate pulse and probe pulse can be propagated through the nonlinear element at an angle to output a signal having a linear range of gate pulse delay times vs. position that directly yields the plot of signal intensity vs. wavelength and gate pulse delay on a single pulse without the need for a variable delay. These and related techniques, and the procedures to recover the intensity and phase information from the time-dependent spectral information provided thereby, are well-known in the art.

It will be useful to describe a particular implementation of the FROG technique in somewhat greater detail. Two pulses, a gate pulse and a signal pulse, are generated. The goal is to measure the intensity I(t) and the phase $\phi(t)$ of the signal pulse. The gate pulse shall be taken as identical to the signal pulse, save for a variable time delay. This can be accomplished as indicated in FIG. 1, wherein an input pulse 100 is split by beamsplitter 101 into a gate pulse 102 and a signal pulse 103. A time delay $\tau$ is applied to gate pulse 102 by delay line 104, which pulse is then recollimated with signal pulse 103 by mirror 105.

The gate pulse 102 and the signal pulse 103 are combined in a nonlinear optical medium 107, often through the action of a focusing lens 108 which serves to increase the interacting electric fields by concentrating the light onto a small spatial region, thereby increasing the quantum efficiency of the nonlinear optical effect being utilized. For simplicity, this nonlinear optical medium should have a response that is faster than the duration of the optical pulse to be measured. We shall refer to such nonlinear optical materials as responding instantaneously. An output pulse 109 is thereby generated.

The electric fields for an output pulse generated using the second-harmonic generation effect are given by $$E_{out}(t,\tau) \, E(t)E(t-\tau);$$

in which t is the time, $\tau$ is the delay, and E(t) is the electric field of the gate and signal pulses (earlier assumed identical save for a time delay of $\tau$ for simplicity). Although a second-order nonlinear effect is used in this illustration, nonlinear optical effects of any order can be used to implement FROG techniques.

Output signal 109 is directed into a spectrometer 110, wherein the spectrum of the output signal is measured as a function of the time delay $\tau$ between gate pulse 102 and signal pulse 103. The measured signal $I_{out}$ is a function of frequency $\omega$ and delay $\tau$:

$$I_{out}(\omega,\tau) \, |\int E_{out}(t,\tau)\exp(-i\omega t)dt|^2$$

The resulting problem is mathematically similar to the two-dimensional phase-retrieval problem, which is known to have an essentially unique solution. Numerous analytical and numerical techniques for finding this solution are known in the art.

FROG-based techniques are particularly adapted to single shot measurements as well as the analysis of multi-shot pulse trains. The term ultrashort is used to refer to pulse durations shorter than about 100 picoseconds. This identifies the regime in which FROG techniques are particularly useful owing to the failure of conventional techniques. However, there is no fundamental restriction to ultrashort pulses, as straightforward adaptation of the FROG techniques may be made to measure optical pulses of any duration desired. There is also no fundamental limit to the wavelengths which may he analyzed using FROG-based techniques. Any limitations which appear in practice are those associated with the detectors and spectrometers available, thus offering the possibility of using FROG-based techniques in the vacuum UV and x-ray regions of the spectrum when suitable detectors and nonlinear materials become available. Finally, although the present discussion is in terms of ultrashort laser pulses, no fundamental restriction to pulses originating from laser sources is intended.

State-of-the-art FROG techniques, flexible as they are, have limitations which restrict their application in a variety of potentially useful applications. Perhaps the most significant limitation is that associated with the use of second-order nonlinear optical effects. Such effects are generally used because of the relatively high quantum efficiency associated therewith. However, second-order nonlinear optical effects are blind to the direction of time. This insensitivity raises the possibility of false and misleading characterization of optical pulse shape and phase.

Adoption of gated third-order nonlinear effects would result in regaining the direction of time, thereby producing data containing more information about the pulse. (As a useful extra, third-order data is also much easier to interpret.) The disadvantage of using third-order nonlinear effects in FROG-based optical pulse analysis is that the quantum efficiency of such processes is dramatically smaller than that for second-order processes, thereby severely limiting the applicability of such techniques.

We address this perceived need by introducing new FROG-based diagnostic techniques which allow the use of third-order nonlinear optical processes in practical measurement of ultrashort optical pulses. These techniques enhance the production of a third-order nonlinear optic signal by either increasing the effective interaction length within which this effect is produced, or by using the phenomenon of interface-enhanced third-harmonic generation, which also reduces the background light that can interfere with the optic signal. Various embodiments and other features, aspects, and advantages of the present invention will become better understood with reference to the following description and appended claims.

SUMMARY OF THE INVENTION

Practical third-order frequency-resolved optical grating (FROG) techniques for characterization of ultrashort optical pulses are disclosed. The techniques are particularly suited to the measurement of single and/or weak optical pulses having pulse durations in the picosecond and subpicosecond regime. The relative quantum inefficiency of third-order nonlinear optical effects is compensated for through i) use of a phase-matched transient grating beam geometry to maximize interaction length, and ii) use of interface-enhanced third-harmonic generation.

DESCRIPTION OF THE INVENTION

The present invention comprises apparatus and method of use of third-order nonlinear optical effects in frequency-resolved optical-grating (FROG) based optical pulse characterization techniques.

In the techniques described herein there is often an option between using a well-characterized gate pulse which is generated separately from the signal pulse, and using a gate pulse which is not characterized beyond being proportional in intensity and identical in phase (save for a time delay) to the signal pulse. The second type of gate pulse is easily generated from a signal pulse, for example, by the use of a beamsplitter to break the original signal pulse into a new signal pulse and a gate pulse (which will then typically be sent through time delay generating optics).

For convenience of expression, an optical pulse differing from an original pulse essentially by a proportionality factor in intensity and by a known time delay in phase shall be called a proportional clone of the original pulse. Note specifically that the original pulse is a proportional clone of itself, so that when a proportional clone of the original pulse is focused within a nonlinear medium, it may be the original pulse, or what is left of the original pulse after passing through, e.g., a beamsplitter. Note further that means to generate a proportional clone may be null, i.e., generating a proportional clone of an original pulse which is identical to the original pulse requires no apparatus.

A number of optical pulses are said to be combined in a region when the space-time trajectories of the pulses overlap within that region. Such combination is necessary for non-linear optical effects to take place between optical pulses. In practice, since the magnitude of nth-order optical effects is proportional to the nth power of the electric fields involved, optical pulses generally are not merely combined, but are also focused or otherwise concentrated to make the region within which they are combined include larger electric fields, thereby increasing the magnitude of the resulting output signal. Note that the focal points do not have to be coincident for such concentration to increase the output signal magnitude, although coincidence is desirable. The requirement is rather that high field regions from each pulse overlap in space-time. We refer to this situation as focusing the optical pulses together.

Figure 2:
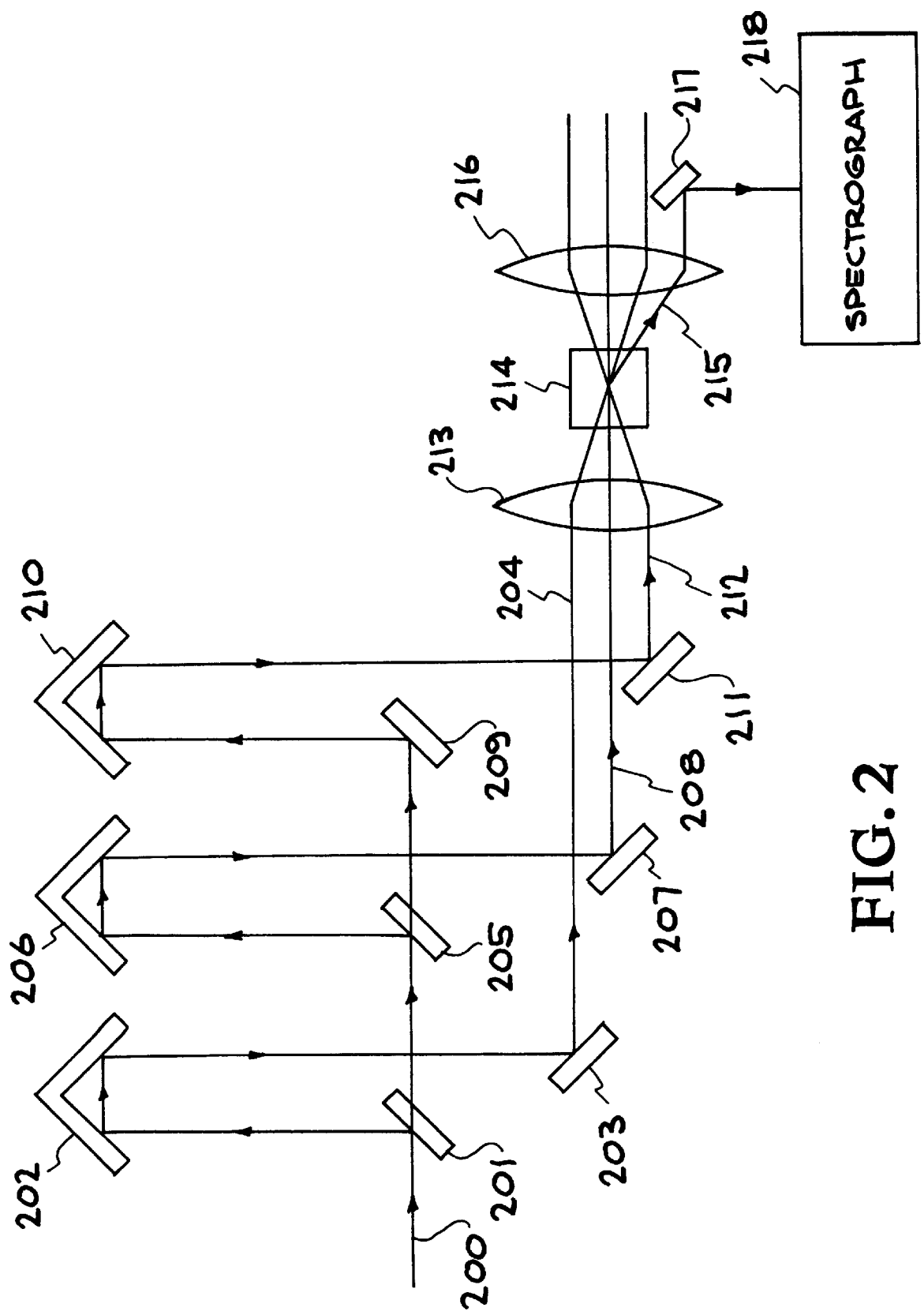
FIG. 2 shows a schematic drawing of a transient-grating FROG-based optical pulse characterization apparatus.

In FIG. 2 appears a schematic representation of how a FROG-based optical pulse characterization system can be based on the transient grating gating effect. In the transient grating effect, the effect of the gating pulse on the nonlinear optical medium is to induce a temporary spatial modulation of the dielectric constant of that medium, thereby temporarily inducing an optical diffraction grating, or a transient grating. This transient grating is used to diffract a portion of the signal pulse into a new direction, thereby allowing its properties to be studied for only the short amount of time that the gating pulse is on.

A first proportional clone 204 of input pulse 200 is formed by the action of beamsplitter 201, retroreflector 202, and mirror 203. (Note that many other combinations of optics can be used to obtain a similar proportional clone.) The time delay of the proportional clone is adjusted by changing the distance from the original optical axis to retroreflector 202.

Similarly, a second (208) and a third (212) proportional clone are also formed through the actions of beamsplitter 205, retroreflector 206, and mirror 207, and through the actions of mirror 209, retroreflector 210, and mirror 211. The net effect of the optics to this point is to form three collimated proportional clones of input pulse 200. When these pulses are non-coplanar and their frequencies and k-vectors add to yield the frequency and k-vector respectively, of the output pulse, $$w_1-w_2+w_3=W_{out}$$

and $$\vec{k}_1-\vec{k}_2+\vec{k}_3=\vec{k}_{out}$$

the process is said to be phase-matched and such an apparatus is often called a BOXCARS arrangement. It is often a preferred apparatus for the present purpose, but this is not intended to limit the current invention to require BOXCARS.

The three proportional clones 204, 208, and 212 are focused together in a region within nonlinear optical medium 214 by focusing lens 213. In so doing, a transient grating is formed which produces a new signal pulse 215. The light emerging from the focal point is collected by lens 216, thereby generating from the three proportional clones the new output pulse 215. Mirror 217 is used to direct output pulse 215 into a spectrograph 218, wherein the spectral content of signal pulse 215 is measured and recorded. By repeating the process of measuring and recording for different values of the relative time shifts of the proportional clones, it is possible to characterize the intensity and phase time dependence of the input pulse.

Note that the pulse characteristics are actually measured at the nonlinear optical medium, i.e., at the typical point of application of the optical pulse. Since many experiments are perform transient grating experiments for other reasons, this method therefore measures the pulse without having to deconvolute the pulse-distortion effects which occur whenever an optical pulse passes through an optical medium on the way to a pulse measurement apparatus. Further, Applicants note that the intensity of the FROG signal is often great enough to allow ambient air to be used as the nonlinear optical element, thereby further simplifying both the apparatus and the difficulty of interpretation of the data resulting from its use. The data is treated much as described earlier, and anyone skilled in the art can easily calculate the pulse characteristics from the time-delay-dependent spectral information collected.

An improvement in the time resolution for characterizing optical pulses is seen when interface-enhanced third harmonic generation is used in a FROG apparatus, as the enhancement only takes place within a very small distance of the interface, and the quantum efficiency of third-harmonic generation elsewhere is very small. When optical pulses are focused together close enough to an interface to produce an enhanced third-harmonic signal, they are said to be focused near the interface. If the interface is approximately perpendicular to the k-vectors of the optical pulses, subfemtosecond pulses are in principle measurable using such techniques.

Figure 1:
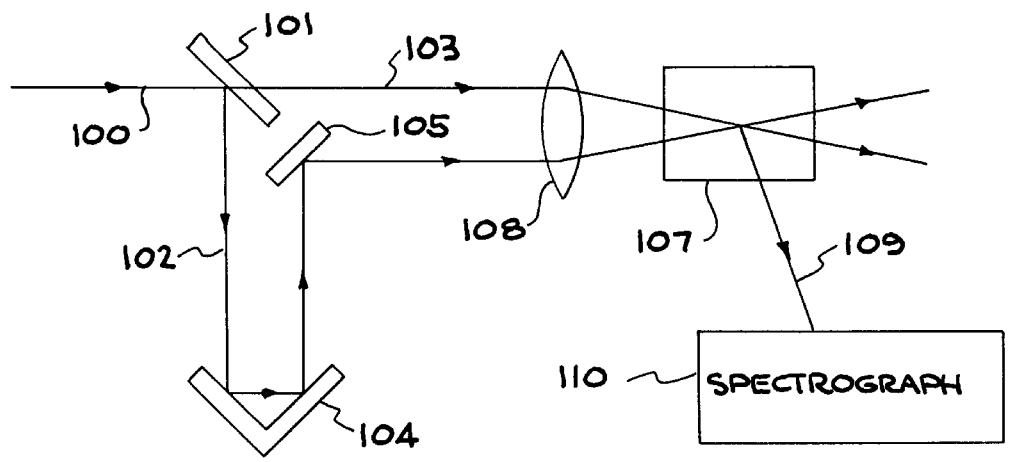
FIG. 1 shows a schematic drawing of a frequency-resolved optical grating (FROG) based optical pulse characterization apparatus.
Figure 3:
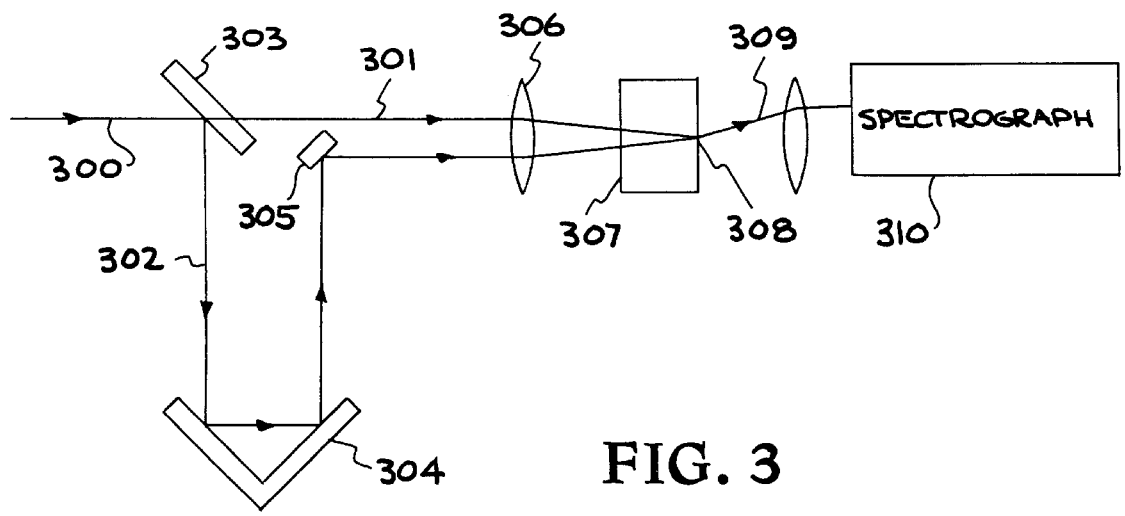
FIG. 3 shows a schematic drawing of a surface-enhanced third-harmonic generation FROG-based optical pulse characterization apparatus.

This approach is illustrated in FIG. 3, wherein an input pulse 300 is separated into collimated first and second proportional clones (301 and 302, respectively) by the actions of beamsplitter 303, retroreflector 304, and mirror 305. Again, the location of retroreflector 304 determines the relative time delay between the two proportional clones.

The proportional clones 301 and 302 are, through the action of lens 306, combined in a region comprising interface 308 within composite nonlinear optical material 307. The interface leads to a greatly enhanced third-harmonic output 309, particularly if proportional clones 301 and 302 are focused by lens 306 to have focal points in the immediate vicinity (say, within several microns) of 308. The third-harmonic output signal 309 is collected and directed into spectrograph 310, wherein the spectral content of signal pulse 309, due to the interaction of the two beams at the surface and which is the cross term of 301 and 302, is measured and recorded. By repeating the process of measuring and recording for different values of the relative time shift of the proportional clones, it is possible to characterize the intensity and phase time dependence of the input pulse.

The present invention has a broad scope, with many variations being possible to one skilled in the art. The present invention is intended to be limited only by the claims appended hereto.

SEQUENCE LISTING

Not Applicable

We claim:

1. A method for measuring an optical pulse in a transient-grating apparatus, comprising:
   i) collecting the optical pulse;
   ii) forming three proportional clones from the optical pulse, each proportional clone having a time delay;
   iii) combining the proportional clones in a region within a nonlinear optical medium, thereby generating an output signal beam of a third-harmonic signal;
   iv) measuring the spectrum of the output signal beam of the third-harmonic signal as a function of the time delays of the three proportional clones; and,
   v) extracting the intensity and phase time-dependencies of the optical pulse from the spectrum.

2. The method of claim 1, wherein the three proportional clones are phase-matched.

3. The method of claim 1, wherein the nonlinear optical medium is a gas.

4. The method of claim 3, wherein the gas is air.

5. The method of claim 1, wherein the step of combining the phase-matched proportional clones in a region within a nonlinear optical medium comprises focusing the phase-matched proportional clones together within the nonlinear optical medium, thereby forming a near-focus generating section of the region.

6. An apparatus for measuring an optical pulse, comprising:
   i) means to produce a first proportional clone from the optical pulse, the first proportional clone having a first time delay;
   ii) means to produce a second proportional clone from the optical pulse, the second proportional clone having a second time delay;
   iii) means to produce a third proportional clone from the optical pulse, the third proportional clone having a third time delay; iv) alignment means to collimate, parallelize, and phase-match the first, second, and third proportional clones;
   v) means to combine the first, second, and third proportional clones within a nonlinear optical medium, thereby producing a signal beam of a third-harmonic signal; and,
   vi) spectrometer means to measure the spectrum of the signal beam of the third-harmonic signal as a function of the first, second, and third time delays.

7. The apparatus of claim 6, wherein the means to produce the first, second, and third proportional clones comprises a BOXCARS optical arrangement.

8. The apparatus of claim 6, wherein the nonlinear optical medium is gaseous.

9. The apparatus of claim 8, wherein the nonlinear optical medium is air.

10. The apparatus of claim 6, wherein the means to combine the first, second, and third proportional clones comprises a focusing lens.

11. A method for measuring an optical pulse, comprising:
   i) collecting an optical pulse;
   ii) generating a proportional clone of the optical pulse;
   iii) forming a time-delayed optical gating pulse;
   iv) combining the proportional clone of the optical pulse and the time-delayed optical gating pulse in a region comprising an interface between two dielectric materials, thereby generating a third-harmonic signal;
   v) measuring a spectrum of the third-harmonic signal as a function of the time delay of the time-delayed optical gating pulse; and,
   vi) extracting the intensity and phase time-dependencies of the optical pulse from the spectrum of the third-harmonic signal as a function of the time delay of the time-delayed optical gating pulse.

12. The method of claim 11, wherein the time-delayed optical gating pulse is a proportional clone of the optical pulse.

13. The method of claim 11, wherein the step of forming the time-delayed optical gating pulse comprises transmitting the optical pulse through a beamsplitter.

14. The method of claim 11, wherein the step of combining the proportional clone of the optical pulse and the time-delayed optical gating pulse at an interface between two dielectric materials comprises focusing the proportional clone and the time-delayed optical gating pulse together near the interface.

15. An apparatus for measuring an optical pulse, comprising:
   i) means to generate a time-delayed gate pulse, the gate pulse having a known intensity and phase behavior;
   ii) means to generate a proportional clone of the optical pulse;
   iii) a first dielectric material and a second dielectric material, positioned such that the first and second dielectric materials are in contact, the contact defining an interface between the dielectric materials;
   iv) means to combine the proportional clone of the optical pulse and the time-delayed gate pulse in a region comprising the interface between the dielectric materials, thereby generating a third-harmonic signal; and,
   v) spectrometer means to measure the spectrum of the third-harmonic signal as a function of the time delay.

16. The apparatus of claim 15, wherein the time-delayed gate pulse is a proportional clone of the optical pulse.

17. The apparatus of claim 15, wherein the means to generate a time-delayed gate pulse comprises a beamsplitter through which the optical pulse passes.

18. The apparatus of claim 15, wherein the first dielectric material is selected from the group consisting of solids, liquids, vacuum, air, and gases.

19. The apparatus of claim 15, wherein the second dielectric material is selected from the group consisting of solids, liquids, vacuum, air, and gases.

20. The apparatus of claim 15, wherein the first dielectric material is substantially transparent to the proportional clone of the optical pulse and to the time-delayed gate pulse, but strongly absorbs the third-harmonic signal, and further wherein the second dielectric material is substantially transparent to the third-harmonic signal.

21. The apparatus of claim 15, wherein said means to combine the proportional clone of the optical pulse and the time-delayed gate pulse in a region comprising the interface between the dielectric materials comprises means to focus the proportional clone and the time-delayed gate pulse together near the interface.

* * * * *